Aug. 5, 1924.

J. MACKAY 1,504,131

NOZZLE OPERATED FAUCET

Filed Dec. 8, 1922

Inventor
John Mackay

Witnesses:

By Joshua R. H. Potts
His Attorney

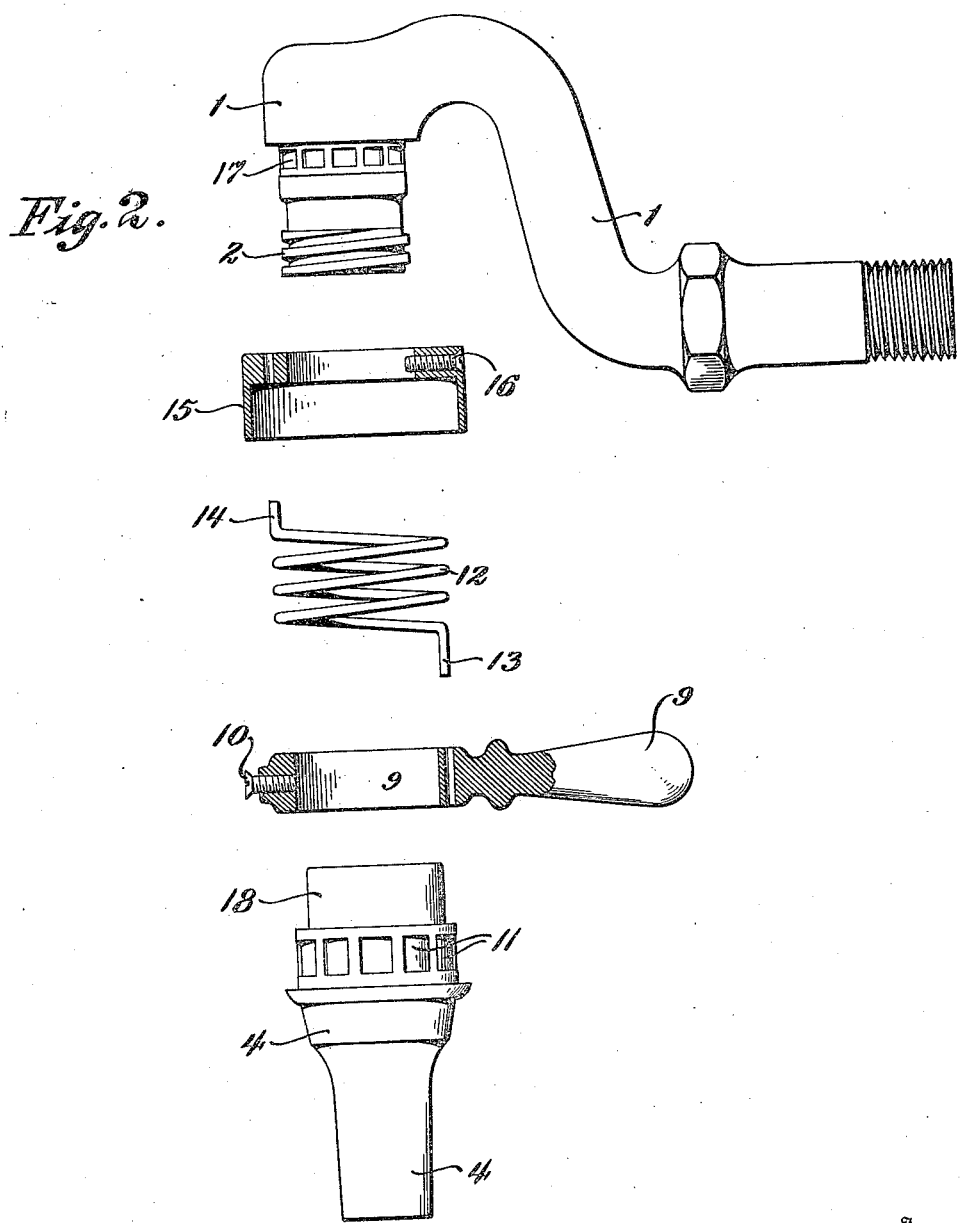

Patented Aug. 5, 1924.

1,504,131

UNITED STATES PATENT OFFICE.

JOHN MACKAY, OF AUDUBON, NEW JERSEY, ASSIGNOR TO THOMAS SAVILL'S SONS, OF PHILADELPHIA, PENNSYLVANIA.

NOZZLE-OPERATED FAUCET.

Application filed December 8, 1922. Serial No. 605,553.

*To all whom it may concern:*

Be it known that I, JOHN MACKAY, a citizen of the United States, residing at Audubon, in the county of Camden and State of New Jersey, have invented certain new and useful Improvements in Nozzle-Operated Faucets, of which the following is a specification.

My invention relates to faucets more particularly of the type in which the nozzle is turned to open and close the valve, and has for its objects to provide a faucet of a neat and simple construction which will automatically close after use and which may be easily assembled and adjusted.

These objects, and other advantageous ends which will be described hereinafter, I attain in the following manner, reference being had to the accompanying drawings in which—

Figure 2 is a disassembled view of the faucet.

Figure 1:
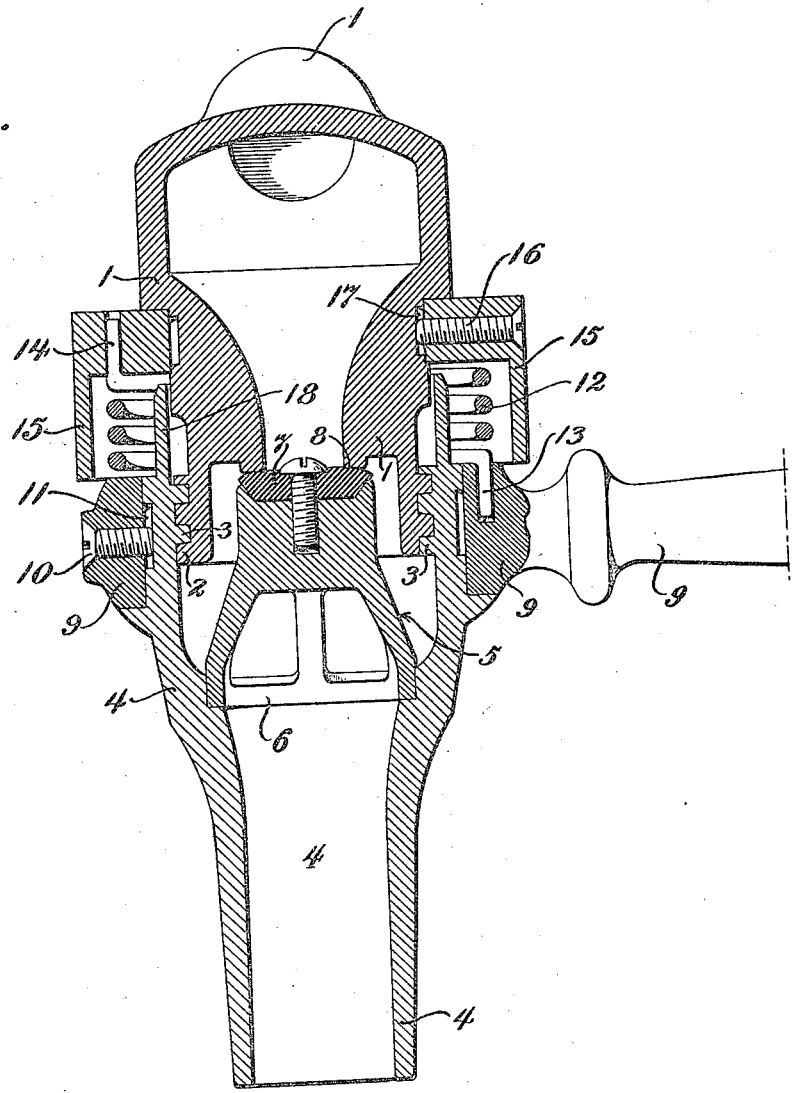
Figure 1 is a vertical section.

Referring to the drawings, 1 is a neck having an externally threaded part 2 which receives an internally threaded part 3 of a nozzle 4 which opens and closes a valve 5. The valve includes a carriage 6 having secured thereto an elastic washer 7 adapted to engage a valve seat 8 in neck 1. An adjusting handle 9 is secured to the nozzle by a screw 10 engaging any of a series of recesses 11 in its periphery. A torsion spring 12 has one end 13 tightly fitting a hole in the handle and the other end 14 likewise fitting in a hole in an adjusting housing 15 which encloses the spring. The housing is secured to the neck by a screw 16 engaging any of a series of recesses 17 spaced in the periphery. A guard 18 extends from the nozzle to prevent the spring from engaging the threads or other parts of the neck which might hinder the operation of the faucet.

When the faucet is assembled one end of the spring is placed in the hole in housing 15 and the housing is placed on the neck with securing screw 16 free of recesses 17. Carriage 6 is placed in the nozzle; handle 9 placed on the nozzle with screw 10 free of recesses 11 and the threaded part 3 of the nozzle engaged with the threaded part 2 of the neck. The nozzle is then turned to bring the carriage 6 and elastic washer 7 into engagement with valve seat 8. During this movement end 13 of the spring will move into the hole in handle 9.

To adjust the faucet the handle is placed in the desired position and the securing screw is turned to engage a recess 11. Housing 15 is turned until sufficient torsion is produced in the spring to automatically close the valve after use. Securing screw 16 is turned until it engages recess 17 and holds the housing in the adjusted position. The faucet is then ready for use.

In using the faucet, handle 9 is moved until the torsion spring engages spring guard 18. This limits the opening of valve 5. When handle 9 is released torsion spring 12 will move it in reversed direction until the valve closes. This limits the movement in that direction.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A nozzle operated faucet comprising a neck; a housing adjustably secured to the neck; a valve, and a spring connected with the housing and having an adjustable connection with the nozzle.

2. A nozzle operated faucet comprising a neck, a housing adjustably secured to the neck; a valve; a handle adjustably connected with the nozzle, and a spring connecting the housing and the handle.

3. A nozzle operated faucet comprising a neck having recesses; a housing; means for securing the housing to a selected recess in the neck; a valve; a nozzle; a handle adjustably secured to the nozzle, and a spring connected with the housing and nozzle for automatically moving the nozzle to effect a closing of the valve.

4. A nozzle operated faucet comprising a neck; a housing adjustably secured to the neck; a valve; a nozzle having recesses; a handle; means for securing the handle to a selected recess in the nozzle, and a spring connected with the housing and handle for automatically moving the nozzle to effect a closing of the valve.

5. A nozzle operated faucet comprising a neck having recesses; a housing; means for securing the housing to a selected recess in the neck; a valve; a nozzle having recesses; a handle; means for securing the handle to a selected recess in the nozzle, and a spring connected with the housing and handle for automatically moving the nozzle to effect a closing of the valve.

6. A nozzle operated faucet comprising a neck; a valve; a nozzle having a threaded connection with the neck; a spring connected with the neck and nozzle for automatically moving the nozzle to effect a closing of the valve, and a guard between the threaded connection and the spring.

In testimony whereof I have signed my name to this specification in the presence of two subscribing witnesses.

JOHN MACKAY.

Witnesses:
 ELIZABETH GARBE,
 CHAS. E. POTTS.